United States Patent
Sarukkai et al.

(10) Patent No.: US 10,771,469 B1
(45) Date of Patent: Sep. 8, 2020

(54) CLOUD SERVICE ACCOUNT MANAGEMENT

(71) Applicant: Skyhigh Networks, LLC, Campbell, CA (US)

(72) Inventors: Sekhar Sarukkai, Cupertino, CA (US); Kaushik Narayan, San Jose, CA (US); Rajiv Gupta, Los Altos, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 417 days.

(21) Appl. No.: 15/419,874

(22) Filed: Jan. 30, 2017

(51) Int. Cl.
| | |
|---|---|
| G06F 21/00 | (2013.01) |
| H04L 29/06 | (2006.01) |
| H04L 29/08 | (2006.01) |
| H04L 12/24 | (2006.01) |

(52) U.S. Cl.
CPC ............ H04L 63/102 (2013.01); H04L 41/02 (2013.01); H04L 67/10 (2013.01)

(58) Field of Classification Search
None
See application file for complete search history.

(56) References Cited

U.S. PATENT DOCUMENTS

| 8,225,383 | B1* | 7/2012 | Channakeshava .... H04L 63/083 726/7 |
| 8,359,016 | B2 | 1/2013 | Lindeman |
| 8,813,242 | B1 | 8/2014 | Ginevan |
| 8,863,253 | B2* | 10/2014 | Iverson ................. H04L 63/083 709/223 |
| 9,060,239 | B1 | 6/2015 | Sinha |
| 2007/0204346 | A1* | 8/2007 | Meier ................. H04L 63/1433 726/25 |
| 2010/0299152 | A1 | 11/2010 | Batchu |
| 2013/0298238 | A1* | 11/2013 | Shah ...................... G06F 21/554 726/23 |
| 2017/0188232 | A1* | 6/2017 | Raleigh ................. H04W 12/06 |
| 2018/0034823 | A1* | 2/2018 | Parees ................... H04L 63/102 |

* cited by examiner

*Primary Examiner* — Alexander Lagor
(74) *Attorney, Agent, or Firm* — Byrne Poh LLP

(57) ABSTRACT

A cloud service account management method identifies unauthorized or unmanaged accounts making administration console access or API access at a cloud computing service and triggers a work flow to place the accounts under management. In one embodiment, the user device is directed to a registration portal to provide credentials of the unauthorized account. Once the accounts are made managed, the cloud service account management method can monitor the activities of the accounts and can apply compliance or security policies to the managed accounts.

22 Claims, 5 Drawing Sheets

CLOUD SERVICE ACCOUNT MANAGEMENT

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

In particular, a system administrator or an information services officer of an enterprise may be charged with the responsibility of administrating one or more cloud service providers, such as an IaaS provider, on behalf of the enterprise for the users of the enterprise. The administrator accesses the cloud service provider through an administrator console. The administrator generally uses an authorized account to access the console. However, in some cases, the administrator may have created a shadow account to access a cloud service provider. These shadow accounts are not managed or monitored by the enterprise and may pose security risks for the enterprise.

DESCRIPTION OF THE DRAWINGS

Various embodiments of the invention are disclosed in the following detailed description and the accompanying drawings.

DETAILED DESCRIPTION

Figure 1:
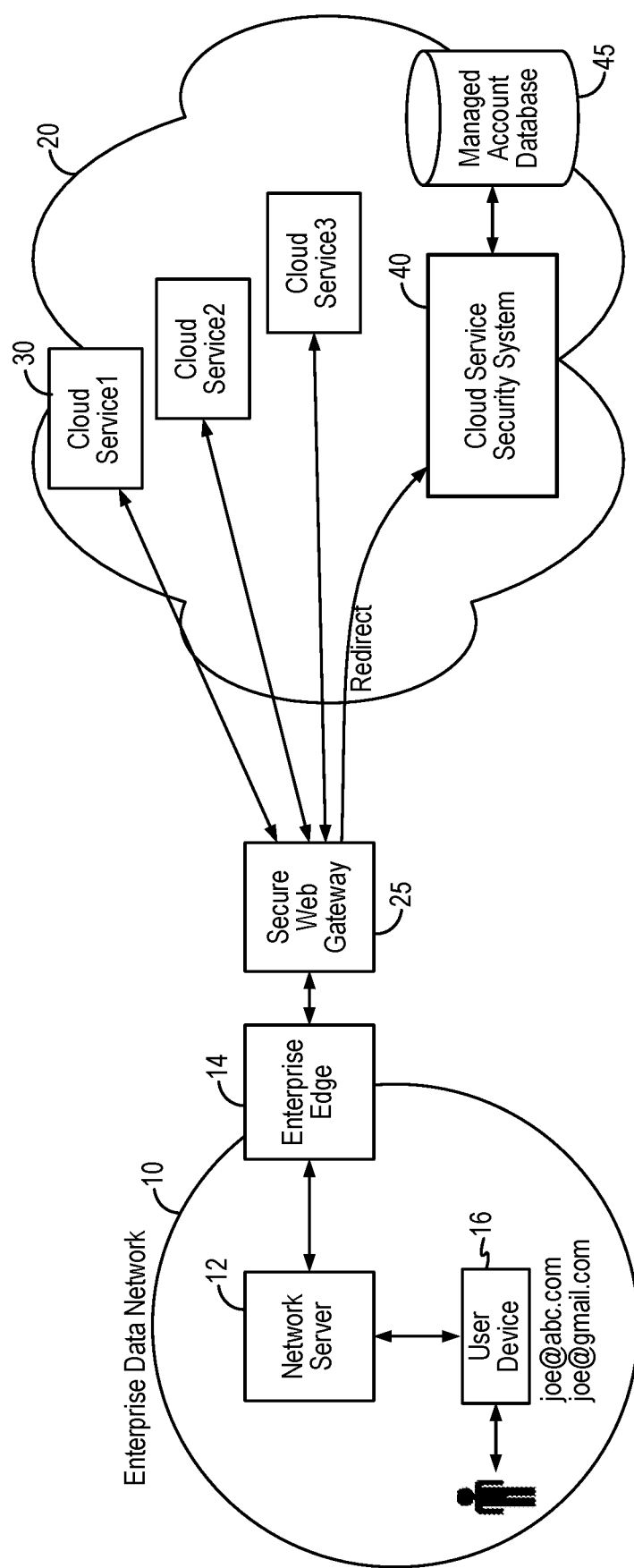
FIG. 1 illustrates an environment in which a cloud service security system and method of the present invention can be implemented in some embodiments.

The invention can be implemented in numerous ways, including as a process or a hardware processor; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud service account management method identifies unauthorized or unmanaged accounts making administration console or API access at a cloud computing service and triggers a work flow to place the unauthorized/unmanaged accounts under management. Once the accounts are made managed, the cloud service account management method can verify the configurations of the instances created by the account and can monitor the activities of the accounts. The cloud service account management method can apply compliance or security policies to the managed accounts at the cloud computing services.

In the present description, a "cloud-based service" or "cloud service" or "cloud computing services" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, cloud computing services, as used herein, can include IaaS (Infrastructure as a Service) or SaaS (Software as a Service) or other types of cloud computing services.

With the proliferation of cloud-based services, an enterprise may wish to adopt one or more cloud computing services for data storage or other applications. The users or employees of the enterprise may access the cloud computing services within or outside of the enterprise's own data network. In some cases, the enterprise may force network traffic between a client device and a cloud-based service to be re-directed through a secure web gateway. In some cases, the users of the enterprise access the cloud-based services without going through the enterprise data network. Regardless of the access methods, the enterprise may wish to deploy security measures to monitor and control the use of the cloud-based services by the enterprise's employees and users. In embodiments of the present invention, the enterprise employs a cloud service security system which implements cloud service account management method to discover for unauthorized or unmanaged accounts attempting access at a cloud service provider and to initiate a work flow to bring the unauthorized/unmanaged accounts into management and monitoring by the enterprise.

FIG. 1 illustrates an environment in which a cloud service security system and method of the present invention can be implemented in some embodiments. Referring to FIG. 1, an enterprise may operate an enterprise data network 10 including one or more network servers 12. The enterprise data network 10 includes an enterprise network edge 14, such as a proxy server, which is used to communicate with outside data networks, such as the public data network 20, which can be the publicly accessible Internet in one example. To ensure network security, the enterprise may deploy a secure web gateway 25 to monitor ingress and egress web traffic of the enterprise data network 10 to enforce security policy compliance. In some embodiments, the secure web gateway 25 can be implemented as a firewall, such as a Next-Generation Firewall.

The enterprise or users of the enterprise data network 10 may wish to use one or more cloud computing services provided by cloud service providers 30, such as Cloud Service 1, Cloud Service 2, and Cloud Service 3, that are deployed on the public data network 20. Network traffic from the user device 16 goes through the network server 12 and travels to the enterprise network edge 14 and through the secure web gateway 25 onto the cloud service providers. Network traffic from the cloud service providers are received at the secure web gateway 25 and then pass to the enterprise network edge 14 and then transmitted onto the network server 12 to be distributed to the user device 16.

As thus configured, a system administrator or an information services officer of the enterprise may be tasked with the responsibility of managing the deployment of the cloud computing services on behalf of the enterprise. For example, the system administrator may be tasked with the responsibility of creating new instances of applications provided by the cloud service providers. For example, the administrator may start up an instance of a database or an instance of other applications for the users of the enterprise to use. The system administrator typically uses an administration console at the cloud computing service to access the cloud computing service to perform the tasks of creating new application instances. Alternately, the system administrator may use an API (Application Program Interface) to access the cloud computing service to perform the tasks of creating new application instances.

In typical situations, the system administrator ("Joe") of an enterprise "ABC", will use an authorized account, such as an account associated with joe@abc.com, to access the cloud computing services. However, in some situations, the system administrator may have created other accounts, such as an account associated with joe@gmail.com, to access the cloud computing services. Although it is possible for the enterprise to simply establish a policy at the cloud computing services to allow only authorized accounts to access the service providers, such a policy is not practical when applied to system administrators or information services officers as these users need access to the cloud computing services to perform management or administrating functions. Therefore, it is often undesirable to strictly deny or block a system administrator's access to a cloud service provider even when they are using an authorized account. In the present embodiment, an unauthorized account refers to an account that is not sanctioned by the enterprise. An unauthorized account is therefore also unmanaged.

Accordingly, the enterprise may implement the cloud service account management method of the present invention to detect for unauthorized or unmanaged accounts accessing cloud computing services and to trigger a work flow to bring the unauthorized or unmanaged accounts into management by the enterprise. In embodiments of the present invention, the cloud service account management method is implemented in a cloud service security system 40, which is deployed on the public data network 20 in the present embodiment. The cloud service security system 40 may be deployed on a private data network of an enterprise, or be deployed on a third party private data network, in other embodiments of the present invention.

In operation, the secure web gateway 25 detects for an access to an administrator console or an API of a cloud service provider 30 using an unauthorized or unmanaged account and redirects the user device 16 to the cloud service security system 40. The cloud service security system 40 implements the cloud service account management method to bring the unauthorized or unmanaged account into management.

In embodiments of the present invention, the cloud service security system 40 maintains a managed account database 45 containing account identifiers and associated metadata of managed accounts. In this manner, the cloud service security system 40 can determine managed accounts and identify unmanaged accounts efficiently. In some embodiments, the managed account database 45 is a secure database.

Figure 2:
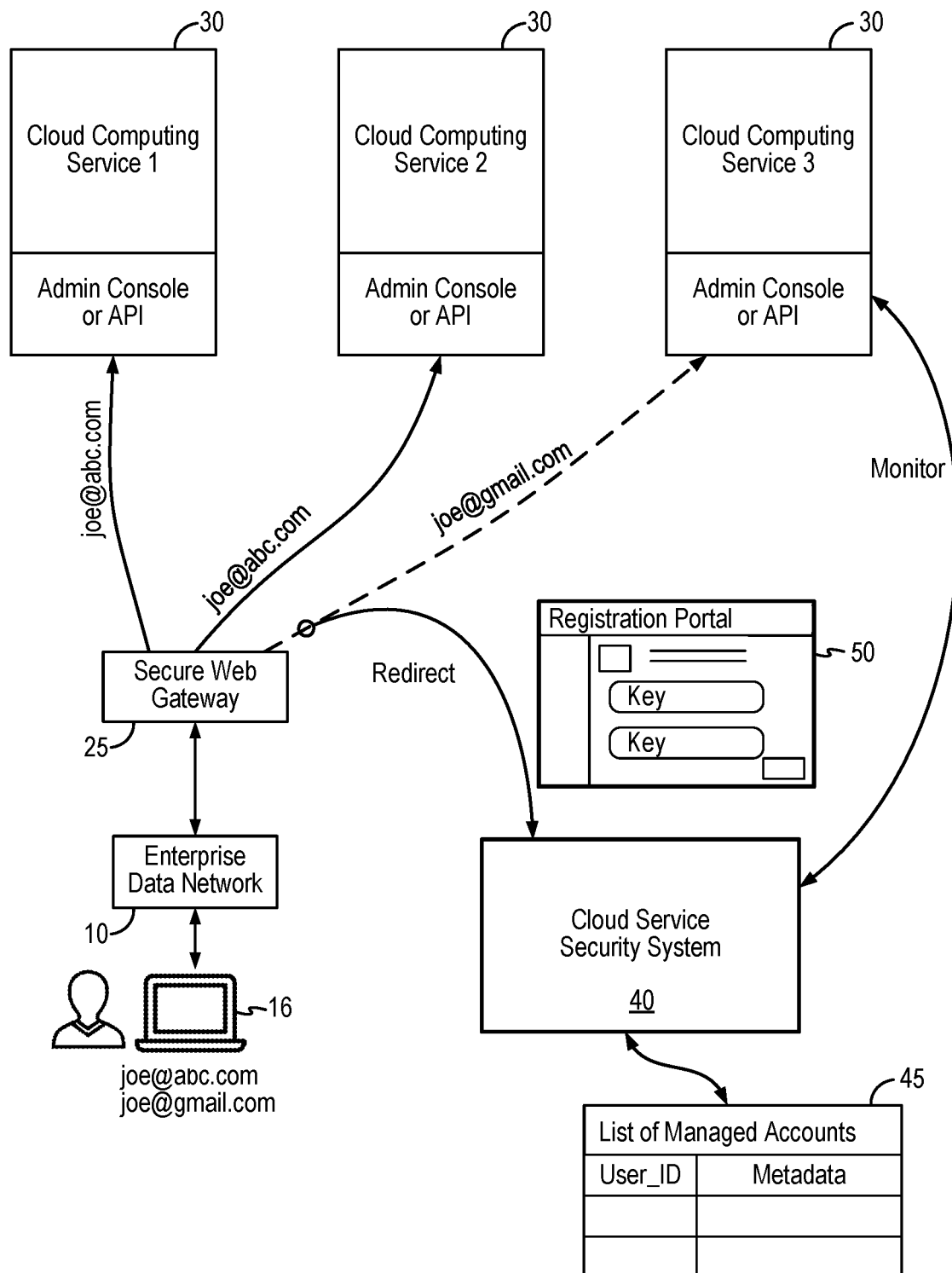
FIG. 2 is a schematic diagram illustrating the operation of the cloud service security system and method in embodiments of the present invention.

FIG. 2 is a schematic diagram illustrating the operation of the cloud service security system and method in embodiments of the present invention. Referring to FIG. 2, a user, such as a system administrator, using a user device 16 on the enterprise data work 10, may attempt to access the administrator console of one or more cloud computing services 30 to perform administrative functions, such as to start up an application instance. In other examples, the user may attempt to access the administrative functions of the cloud computing services 30 through an API. In the event that the system administrator 16 uses an authorized account (e.g., joe@abc.com), the secure web gateway 25 confirms the authorized account and allows the network traffic so that the system administrator may access the cloud computing services, such as cloud computing service 1 and cloud computing service 2, to perform administrative functions. In most cases, authorized accounts are under management by the enterprise and are therefore already being managed per the security policy of the enterprise.

However, in some cases, the system administrator may use an unauthorized account (e.g., joe@gmail.com) to access the cloud computing service 3. Alternately, in some cases, the system administrator may use an authorized account (e.g., joe@abc.com) but the account has not yet been registered with the enterprise and therefore the unregistered authorized account is still treated as an unauthorized account. The secure web gateway 25 detects the access to an administration console at cloud computing service 3 using an unauthorized account and redirects the user to the cloud service security system 40. The cloud service security system 40, implementing the cloud service account management method of the present invention, directs the user to a registration portal 50. The registration portal 50 informs the user that he/she should not be using the cloud computing service unmanaged and provides an option for the user to allow the unauthorized account to become managed. Through the registration portal 50, the cloud service account management method requests the user to provide the credentials associated with the unauthorized account. The credentials can be the login credentials of the account, or the security keys or the access token associated with the account. In the present embodiment, the registration portal 50 requests the security keys of the unauthorized account.

The cloud service security system 40, with the security key associated with the unauthorized account, can now bring the unauthorized account into management. More specifically, the cloud service security system 40 can start monitoring the account and applying security policies specified by the enterprise. The cloud service security system 40 further stores the account information, such as the account identifier or user_ID and associated metadata into the managed account database 45 to identify the account as being managed. The metadata associated with the managed account may include the credentials (e.g. security key), the date and time the account is put in management and other information.

In embodiments of the present invention, the cloud service security system 40 may perform monitoring of the managed accounts by accessing the accounts at the cloud computing services 30 using the credentials obtained for the managed accounts. The cloud service security system 40 may perform monitoring functions including performing configuration audits to determine whether the application instances created by the account at the cloud computing service are configured correctly. The cloud service security system 40 may apply enterprise specified security policies to the account and may perform periodic audit of user activities at the cloud computing service to determine that the user activities are in compliance with enterprise security policies. In this manner, the accounts are being managed to ensure security for the enterprise.

Figure 3:
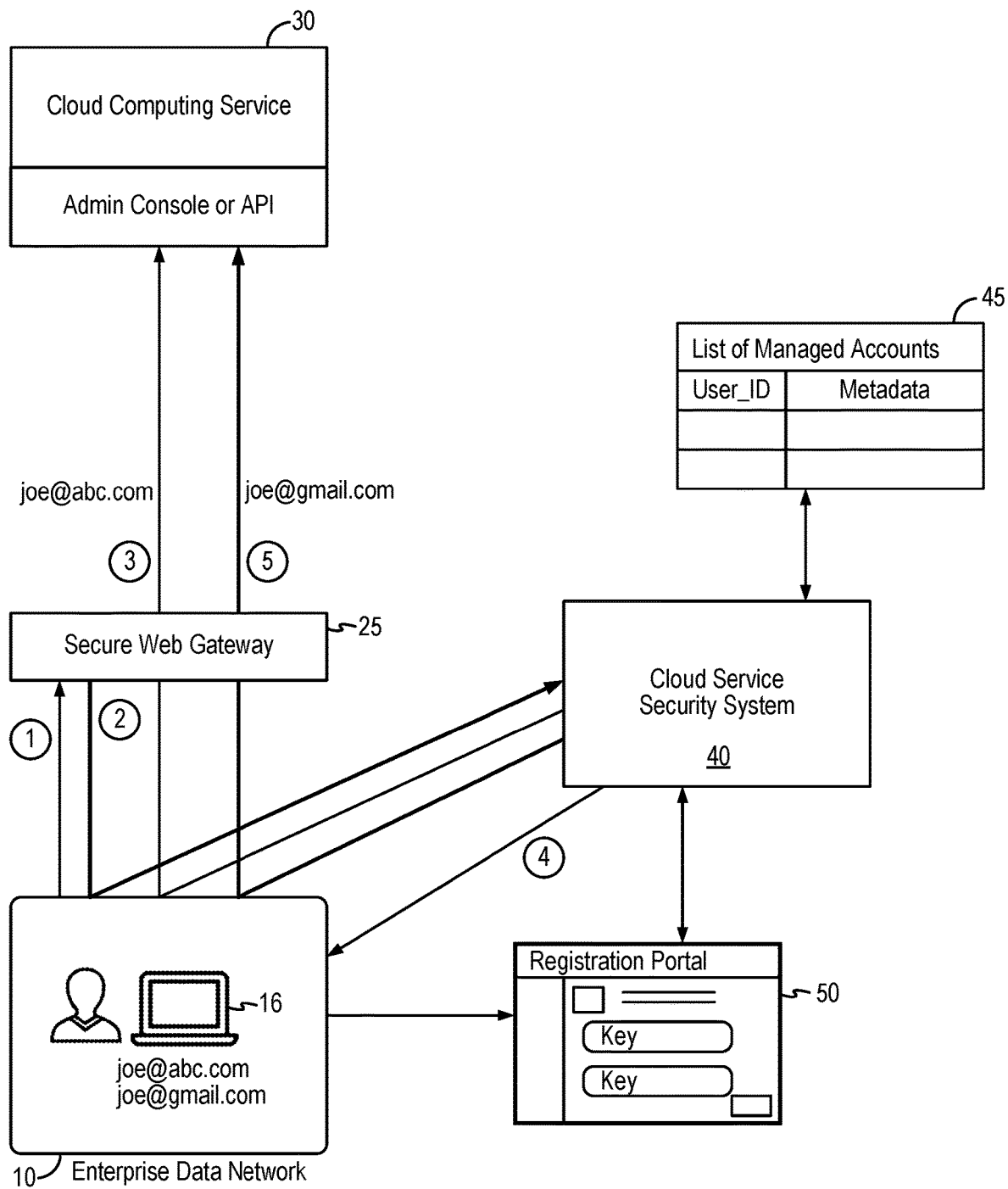
FIG. 3 illustrates the process flow of the cloud service account management method in embodiments of the present invention.

FIG. 3 illustrates the process flow of the cloud service account management method in embodiments of the present invention. Referring to FIG. 3, a system administrator using a user device 16, may attempt to access cloud computing service 1 to perform administrative functions. The user device 16 is operating within the enterprise data network 10 which has all its network traffic passed through the secure web gateway 25. When the user device 16 makes an access to the cloud computing service 30 ("1"), the secure web gateway 25 redirects the user device to the cloud service security system 40 ("2"). Typically, the user device 16 makes an administration console access at the cloud computing service. The user device 16 can also access administrative functions using an API access at the cloud computing service.

The cloud service security system 40 verifies the account being used as an authorized account or an unauthorized account. For example, when the user device 16 uses an authorized account (e.g. joe@abc.com) to make the access, the cloud service security system 40 determines that the account is authorized and returns the user device 16 to the secure web gateway 25 where the secure web gateway 25 allows the network traffic to the cloud computing service 30 ("3").

However, in the event that the user device 16 uses an unauthorized account (e.g. joe@gmail.com) to make the access, the cloud service security system 40 determines that the account is unauthorized and redirects the user device 16 to a registration portal 50 ("4"). At the registration portal 50, the user device may provide credential information for the unauthorized account, such as the security key for the account, to register the account and to render the account managed. Once, the unauthorized account becomes managed, the cloud service security system 40 returns the user device to the secure web gateway 25 where the secure web gateway 25 allows the network traffic to the cloud computing service 30 ("5").

In some embodiments, the cloud service security system 40 uses the managed account database 45 to identify an account as being managed and authorized or as being unmanaged and unauthorized. Furthermore, when an unauthorized account completes the registration, the cloud service security system 40 stores the account information, such as the account identifier or user_ID and associated metadata into the managed account database 45 to identify the account as being managed.

Figure 4:
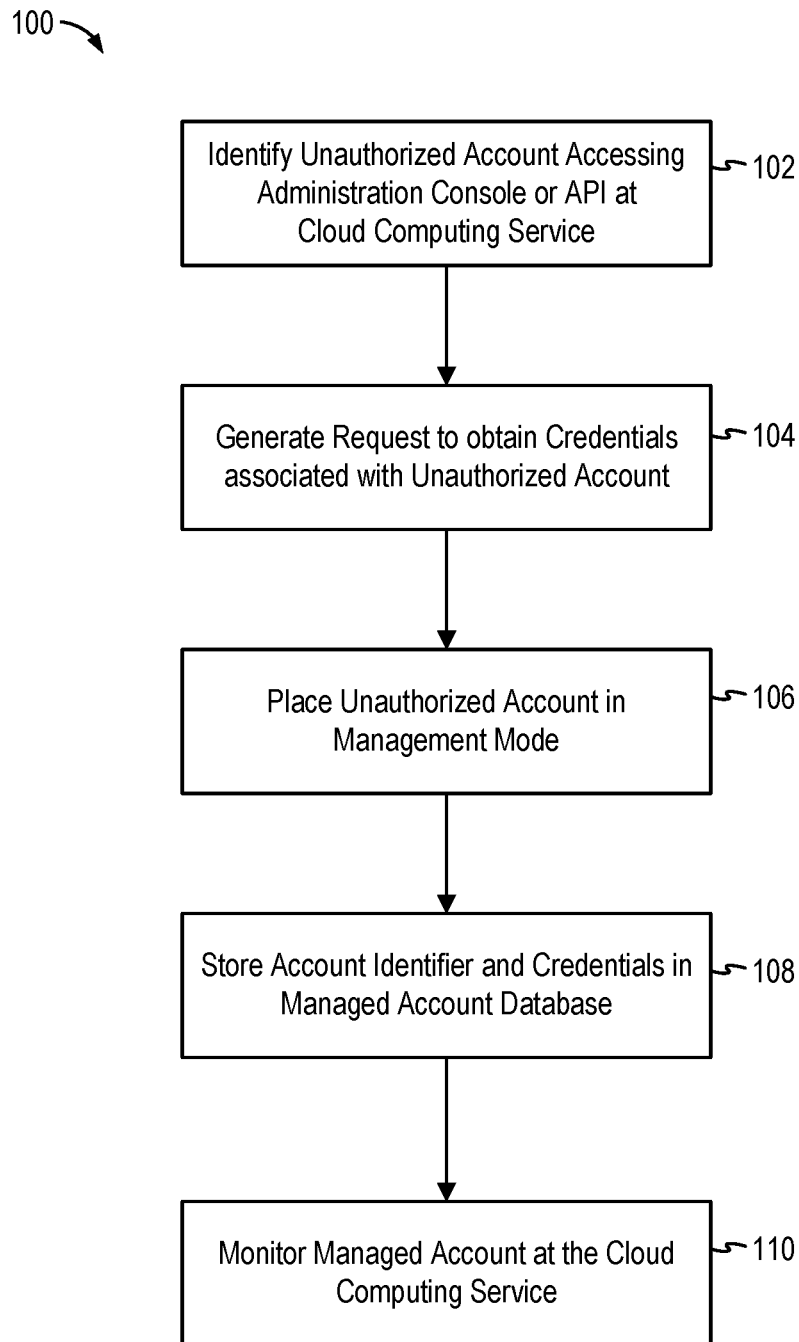
FIG. 4 is a flowchart illustrating a cloud service account management method in embodiments of the present invention.

FIG. 4 is a flowchart illustrating a cloud service account management method in embodiments of the present invention. An enterprise may adopt the cloud computing service account management method of the present invention to ensure security of the enterprise in using cloud computing services. Referring to FIG. 4, a cloud computing service account management method 100 ("method 100") starts by identifying unauthorized accounts attempting to access the administration console or the API of a cloud computing service (102). In some embodiments, the method 100 identifies unauthorized accounts by comparing the account identifier, such as the user ID, to the list of managed accounts stored at the managed account database 45.

The method 100 then initiates a workflow to bring the unauthorized account under management. More specifically, the method 100 generates a request to obtain from the user device credentials associated with the unauthorized account (104). For example, the user may copy the login credential or the security key or an access token from a console of the cloud computing service and provide the credential or security key or an access token to the method 100. The method 100 then places the account in a management mode (106). The unauthorized account becomes a managed account. The method 100 further stores the account identifier (such as the user ID) and the credentials and other metadata in a secure managed account database (108). In this manner, the previously unmanaged account has now become managed by method 100. The method 100 may then monitor the managed account at the cloud computing service (110). For example, the method 100 may use the credentials to access the account at the cloud computing service to perform audits and monitoring based on the enterprise's security policy. For example, the method 100 may perform configuration audit of application instances created by the managed account, perform user activity audit and monitor the user activities.

In the event that the credentials for the unauthorized account is not provided to the method 100, the method 100 may implement remedial measures such as generating an alert to the enterprise.

Figure 5:
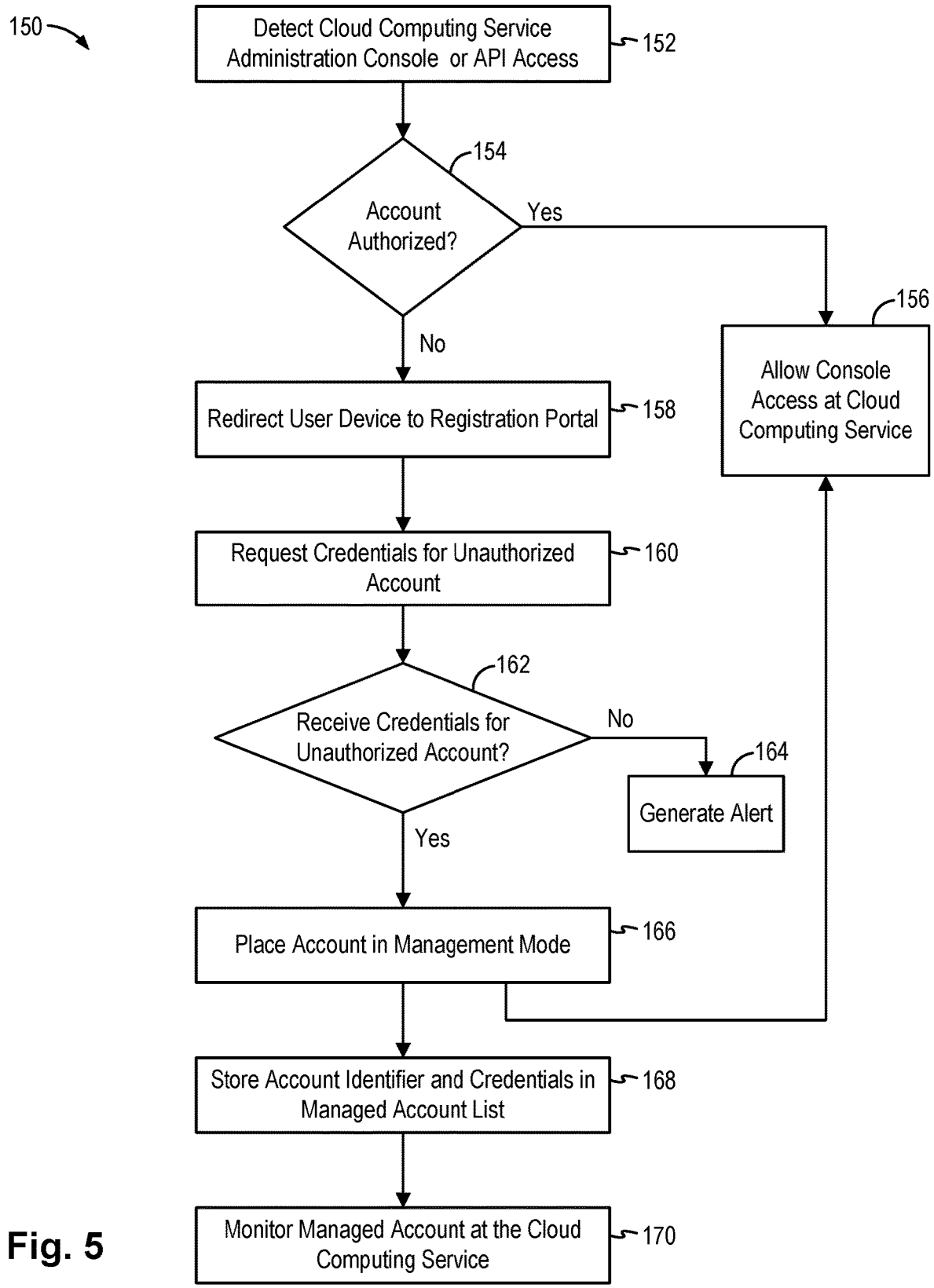
FIG. 5 is a flowchart illustrating a cloud service account management method in an alternate embodiment of the present invention.

FIG. 5 is a flowchart illustrating a cloud computing service account management method in an alternate embodiment of the present invention. An enterprise may adopt the cloud computing service account management method of the present invention to ensure security of the enterprise in using cloud computing services. Referring to FIG. 5, a cloud computing service account management method 150 ("method 150") starts by detecting an administration console access or an API access at a cloud computing service (152). The method 150 then determines if the account used to make the console or API access is authorized or not (154). In one embodiment, the method 150 identifies unauthorized accounts by comparing the user ID to the list of managed accounts stored at the managed account database 45.

In the event that the account is determined to be a managed or authorized account, the method 150 allows the managed account to make console access at the destination cloud computing service (156). However, in the event that the account is determined to be an unmanaged or unauthorized account, the method 150 initiates a work flow to put the account under management. More specifically, the method 150 redirects the user device to a registration portal (158). In some embodiments, the registration portal is served by the cloud service security system 40. Through the registration portal, the method 150 requests the credentials for the unauthorized/unmanaged account (160). The method 150 then receives the credentials for the unauthorized/unmanaged account (162). For example, the login credentials or the security key or the access token may be copied from a console of the cloud computing service and provided to the method 150 by pasting the credentials/security keys/access token onto the registration portal.

In the event that the credentials are not provided, the method 150 may generate an alert to the enterprise of the access by the unauthorized account (164). In the event that the credentials for the unauthorized/unmanaged account is provided, the method 150 enables monitoring of the account at the cloud computing service (166). The account then becomes a managed account. The method 150 then allows the managed account to make console access at the destination cloud computing service (156). The method 150 further stores the account identifier (such as the user ID) and the credentials and other metadata in the managed account database (168). The method 150 can then monitor the account at the cloud computing service based on the security policy of the enterprise (170). For example, the method 150 may use the credentials to access the account at the cloud computing service to perform configuration audit, to perform user activity audit and to monitor the user activities. In this manner, an unmanaged account becomes managed. In one example, the configuration audit may detect that an instance of an application on the cloud computing service has not been configured correctly and the method 150 may alert the user or system administrator to take corrective action.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of implementing cloud service account management by an enterprise, the method comprising:
   identifying, using a hardware processor, traffic, wherein the traffic is associated with an access at a cloud computing service, the access made using an unmanaged account that is not managed by the enterprise;
   generating, using the hardware processor, a request to obtain credentials associated with the unmanaged account;
   receiving the credentials associated with the unmanaged account;
   in response to receiving the credentials associated with the unmanaged account, placing, using the hardware processor, the unmanaged account in a management mode so that the unmanaged account becomes a managed account; and
   monitoring, using the hardware processor, the managed account at the cloud computing service.

2. The method of claim 1, further comprising:
   storing, using the hardware processor, an account identifier associated with the managed account and the credentials in a managed account database.

3. The method of claim 2, wherein identifying, using the hardware processor, the traffic associated with the access at the cloud computing service using the unmanaged account comprises:
   comparing the account identifier to a list of managed accounts in the managed account database.

4. The method of claim 1, wherein identifying, using the hardware processor, the traffic associated with the access at the cloud computing service using the unmanaged account comprises:
   identifying, using the hardware processor, an administration console access at the cloud computing service using the unmanaged account.

5. The method of claim 1, wherein identifying, using the hardware processor, the traffic associated with the access at the cloud computing service using the unmanaged account comprises:
   identifying, using the hardware processor, an application program interface (API) access at the cloud computing service using the unmanaged account.

6. The method of claim 1, wherein generating, using the hardware processor, the request to obtain credentials associated with the unmanaged account comprises:
   generating, using the hardware processor, a request to obtain a security key associated with the unmanaged account.

7. The method of claim 1, wherein generating, using the hardware processor, the request to obtain credentials associated with the unmanaged account comprises:
   generating, using the hardware processor, a request to obtain an access token associated with the unmanaged account.

8. The method of claim 1, wherein generating, using the hardware processor, the request to obtain credentials associated with the unmanaged account comprises:
   providing, using the hardware processor, a registration portal requesting the credentials associated with the unmanaged account; and
   receiving the credentials entered onto the registration portal.

9. The method of claim 1, wherein monitoring, using the hardware processor, the managed account at the cloud computing service comprises:
   using the credentials of the managed account to access the managed account at the cloud computing service; and
   performing an audit of the managed account at the cloud computing service.

10. The method of claim 9, wherein performing the audit of the managed account at the cloud computing service comprises:
    performing a configuration audit to assess the configuration of application instances created by the managed account at the cloud computing service to determine compliance with security policies of the enterprise.

11. The method of claim 9, wherein performing the audit of the managed account at the cloud computing service comprises:
    performing a user activity audit at the cloud computing service to assess user activities associated with the managed account to determine compliance with security policies of the enterprise.

12. The method of claim 1, further comprising:

in response to the credentials associated with the unmanaged account not being received, generating an alert to the enterprise concerning the access by the unmanaged account.

13. A system for implementing cloud service account management by an enterprise, the system comprising:
a hardware processor; and
a memory coupled with the hardware processor, wherein the memory is configured to provide the processor with instructions which when executed cause the processor to:
identify traffic, wherein the traffic is associated with an access at a cloud computing service, the access made using an unmanaged account that is not managed by the enterprise;
generate a request to obtain credentials associated with the unmanaged account;
receive the credentials associated with the unmanaged account;
in response to receiving the credentials associated with the unmanaged account, place the unmanaged account in a management mode so that the unmanaged account becomes a managed account; and
monitor the managed account at the cloud computing service.

14. The system of claim 13, wherein the memory is further configured to provide the processor with instructions which when executed cause the processor to:
store an account identifier associated with the managed account and the credentials in a managed account database.

15. The system of claim 14, wherein the memory is further configured to provide the processor with instructions which when executed cause the processor to:
compare the account identifier to a list of managed accounts in the managed account database.

16. The system of claim 13, wherein the memory is further configured to provide the processor with instructions which when executed cause the processor to:
identify an administration console access or an application program interface (API) access at the cloud computing service using the unmanaged account.

17. The system of claim 13, wherein the memory is further configured to provide the processor with instructions which when executed cause the processor to:
generate a request to obtain a security key or an access token associated with the unmanaged account.

18. The system of claim 13, wherein the memory is further configured to provide the processor with instructions which when executed cause the processor to:
provide a registration portal requesting the credentials associated with the unmanaged account; and
receiving the credentials entered onto the registration portal.

19. The system of claim 13, wherein the memory is further configured to provide the processor with instructions which when executed cause the processor to:
monitor the managed account at the cloud computing service by using the credentials to access the account at the cloud computing service and performing an audit at the cloud computing service.

20. The system of claim 19, wherein the memory is further configured to provide the processor with instructions which when executed cause the processor to:
perform a configuration audit at the cloud computing service to assess the configuration of application instances created by the managed account.

21. The system of claim 19, wherein the memory is further configured to provide the processor with instructions which when executed cause the processor to:
perform a user activity audit at the cloud computing service to determine user activities associated with the managed account are in compliance with security policies of the enterprise.

22. The system of claim 13, wherein the memory is further configured to provide the processor with instructions which when executed cause the processor to: in response to the credentials associated with the unmanaged account not being received, generating an alert to the enterprise concerning the administration console access by the unmanaged account.

* * * * *